Feb. 28, 1956  A. M. COMPTON  2,736,571
LEAF SPRING, CLOSE-SPACED TANDEM RUNNING GEAR
Filed Sept. 13, 1954  4 Sheets-Sheet 1

INVENTOR.
Arthur M. Compton
BY
ATTORNEY.

Feb. 28, 1956  A. M. COMPTON  2,736,571
LEAF SPRING, CLOSE-SPACED TANDEM RUNNING GEAR
Filed Sept. 13, 1954  4 Sheets-Sheet 4
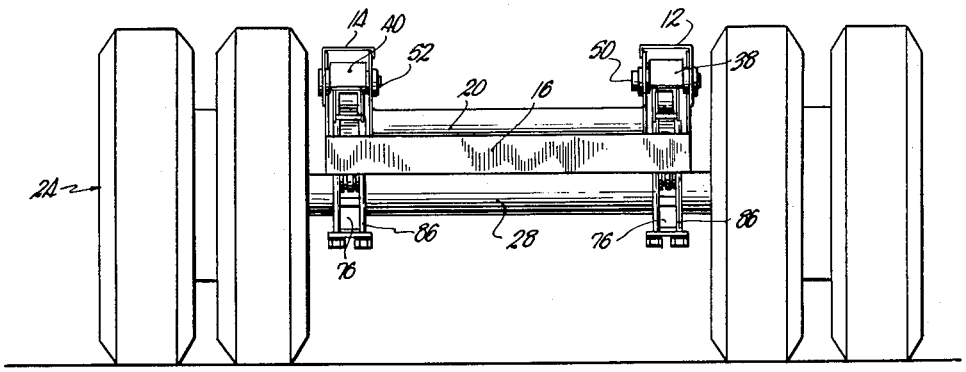
Fig. 5.
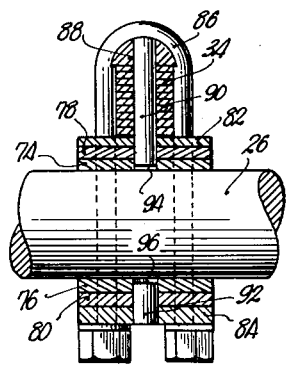
Fig. 6.
Fig. 7.
INVENTOR.
Arthur M. Compton
BY
ATTORNEY.

United States Patent Office 2,736,571
Patented Feb. 28, 1956

2,736,571

LEAF SPRING, CLOSE-SPACED TANDEM RUNNING GEAR

Arthur M. Compton, Bethel, Kans., assignor to Standard Steel Works, North Kansas City, Mo., a corporation of Missouri Application September 13, 1954, Serial No. 460,470

5 Claims. (Cl. 280—104.5)

This invention relates to multi-wheel vehicles and particularly to a novel tandem wheel and axle assembly connected with an overlying frame in a new and advantageous manner.

It is the primary object of the present invention to provide an arrangement of tandem wheel and axle assemblies for a truck or trailer that includes the use of relatively long rocker means or equalizers acting upon the forwardmost ends of both front and rear spring units so that brake torque will not adversely affect load distribution and so that the bearings about which the rocker means swings does not receive the vertical loads which result from spring rear end kick-up accompanying brake application, the rear ends of the springs acting against solid wear plates affixed to the frame of the trailer.

An object of this invention is to provide a transportation vehicle wherein the wheels supporting one of the axles will "track" properly so as to avoid dragging and scuffing of the tires, as well as excessive wear and tear on the various component parts of the entire undercarriage itself.

Another important object hereof is to provide a novel suspension for all of the wheels of a transportation vehicles permitting independent vertical movement of each axle in response to uneven terrain, all while maintaining the aforementioned prerequisite of proper tracking of the rearmost wheels especially when disposed a relatively great distance from the dirigible wheel and axle assembly of a tractor.

A still further object of this invention is to provide an undercarriage of the type having a pair of tandem axles so suspended as to permit vertical movement of the axles independently or relatively in response to rises and falls in the terrain, all while maintaining proper load distribution as aforementioned.

Still another important object of the instant invention is to provide a closely spaced tandem running gear assembly having the springs thereof canted with the forwardmost ends thereof normally higher than the rearmost ends of the springs so that the spring deflection is in a direction to absorb not only vertical loads, but a large portion of the horizontal component of rises and indentations of the terrain.

It is another important object of the present invention to provide an undercarriage of the aforementioned character equipped with spaced equalizers in a manner to cause the springs to cant still further beyond their normal positions into the rise or dips in terrain as increased loads are applied to the bump, depending upon the speed of travel and the weight of the trailer and its contents upon the undercarriage.

An object of the present invention is to provide an undercarriage having the springs and equalizers thereof located directly beneath the longitudinal beams of the frame for safety purposes and to lower the center of gravity of the entire unit.

Other objects include the way in which the springs are adapted to slide not only longitudinally, but transversely at both ends thereof against wear plates mounted on the frame and at the ends of the equalizers; the way of coupling the axles with the frames through use of radius rods in a manner to permit movement of the axles toward and away from the overlying frame as well as on vertical axes; the way in which the canted springs are pivotally secured to their axles for swinging movement relative thereto on upright, inclined axes; the manner of making connection through use of the aforesaid radius rods such as to permit relative movement between the springs and their axles; and the way in which the effective lengths of the radius rods are chosen to provide for proper tracking during manipulation of curves or turns.

In the drawings:

Fig. 5 is a rear elevational view thereof.

Fig. 6 is an enlarged, fragmentary, detailed, cross-sectional view taken on line VI—VI of Fig. 3; and Fig. 7 is a fragmentary, detailed, cross-sectional view taken on line VII—VII of Fig. 3.

Figure 1:
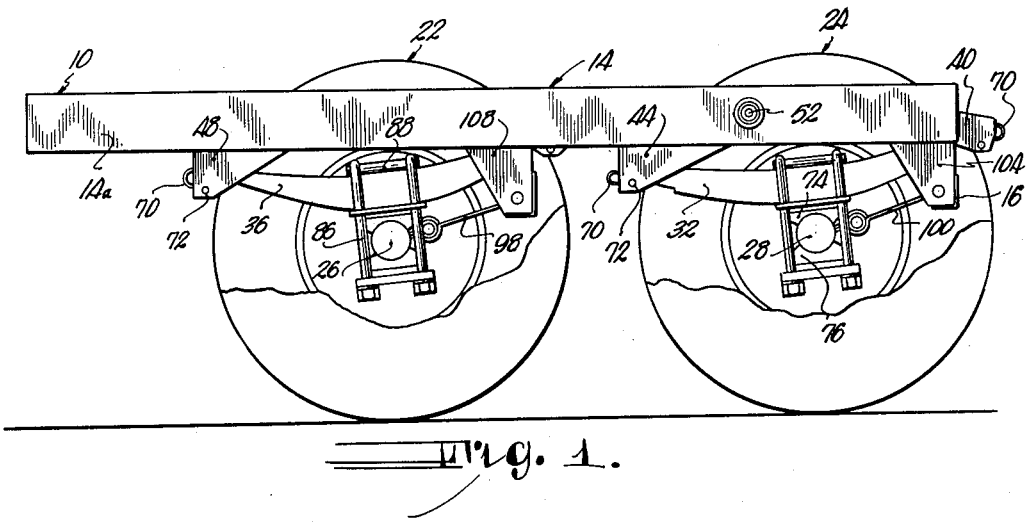
Figure 1 is a side elevational view of a leaf spring, close-spaced tandem running gear made according to my present invention, the proximal wheels and tires being broken away for clearness.
Figure 2:
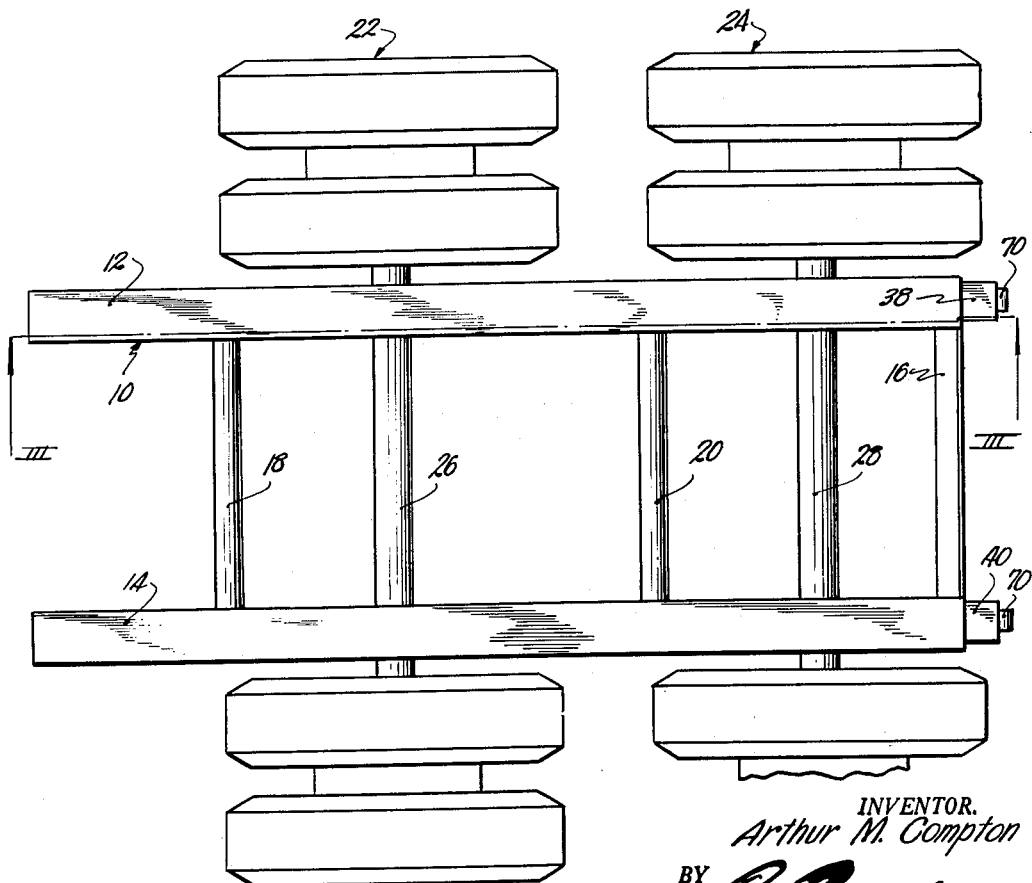
Fig. 2 is a top plan view thereof.

The tractor with which the semi-trailer illustrated in the drawings is adapted to be used, is not shown since the same forms no part of the present invention, and it is clear that any suitable coupling may be utilized such as the conventional fifth-wheel assembly. For example, if an elongated tank or other body is secured at its rearmost end to trailer frame 10 shown in the drawings, the forwardmost end of such tank or body may be supported by, and be pivotally secured to the tractor through the fifth-wheel assembly in the usual manner.

Frame 10 includes a pair of longitudinal beams 12 and 14 that may be substantially J-shaped in cross-sectional configuration as seen in Figs. 5 and 7, presenting outermost side flanges 12a and 14a respectively. The beams 12 and 14 may be interconnected in any suitable manner such as by a cross member 16 and by cross elements 18 and 20.

The trailer frame 10 is supported by a pair of wheel and axle assemblies broadly designated by the numerals 22 and 24 and provided with spaced axles 26 and 28 respectively. Each of the assemblies 22 and 24 is provided with spring units, the front axle having a pair of downwardly bowed, semi-elliptical leaf spring sections 30 and 32 and the rear axle 26 being provided with similar spring sections 34 and 36. It is to be preferred that the springs be of the progressive rate type, providing more deflection per pound of applied load in the light condition than in the loaded condition and all four spring sections 30, 32, 34 and 36 are secured to their corresponding axles 26 and 28 thereabove in a manner hereinafter to be made clear.

Noteworthy at the outset is that the springs 30 and 34 directly underlie the beam 12, while springs 32 and 36 are disposed directly beneath the beam 14. Rocker means in the nature of a pair of elongated, relatively long equalizers or compensating members 38 and 40 are provided for the beams 12 and 14 respectively, similarly located directly beneath such beams 12 and 14. Equalizers 38 and 40 are preferably tubular and have their forwardmost ends supported by the forwardmost ends of springs 30 and 32, whereas the rearmost ends of the equalizers 38 and 40 are supported by the foremost ends of springs 34 and 36.

Brackets 42 and 44 rigid to beams 12 and 14 respectively, support the rearmost ends of spring sections 30 and 32 respectively. Similarly, brackets 46 and 48 rigid to beams 12 and 14 respectively, support the rearmost ends of spring sections 34 and 36 respectively. Cross element 18 rigidly interconnects the brackets 46 and 48, whereas, cross element 20 similarly interconnects the brackets 42 and 44.

Equalizer 38, which directly overlies the spring section 30, is pivoted intermediate the ends thereof for swinging movement on a horizontal axis through the medium of a trunnion 50 passing therethrough and carried by the flange 12a and the bracket 42. The equalizer 40 which directly overlies the spring section 32, is similarly mounted for swinging movement on a horizontal axis aligned with the trunnion 50 by a trunnion 52 passing through the equalizer 40 and secured to the flange 14a as well as to the bracket 44.

Wear plates 54 and 56 rigid to the equalizers 38 and 40 respectively, at the forwardmost ends thereof, slidably receive the spring sections 30 and 32 respectively. Wear plates 58 and 60 rigid to the equalizers 38 and 40 respectively, at the rearmost ends thereof, slidably receive the spring sections 34 and 36 respectively. Wear plates 62 and 64 rigid to the brackets 42 and 44 respectively, slidably receive the spring sections 30 and 32 respectively. And, wear plates 66 and 68 rigid to the brackets 46 and 48 respectively, slidably receive the spring sections 34 and 36 respectively.

All of the springs 30, 32, 34 and 36 are equipped with "shepherd's crooks" 70 at each end thereof, engaging underlying pins 72 for holding the spring sections against their wear plates, thereby preventing the hammering that normally takes place between the spring ends and their wear plates in conventional structures whenever the unit encounters rough terrain particularly in the unloaded condition.

Figure 3:
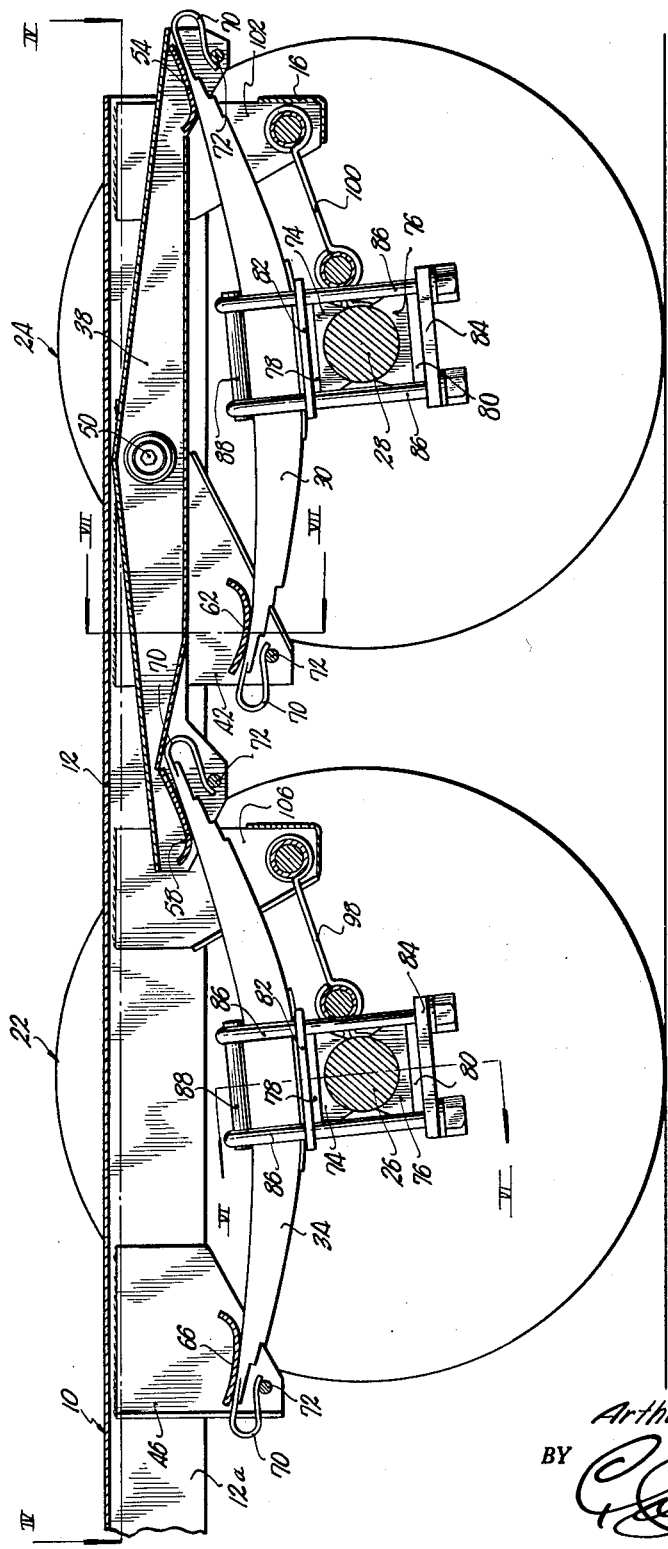
Fig. 3 is an enlarged, longitudinal, cross-sectional view taken substantially on line III—III of Fig. 2.
Figure 4:
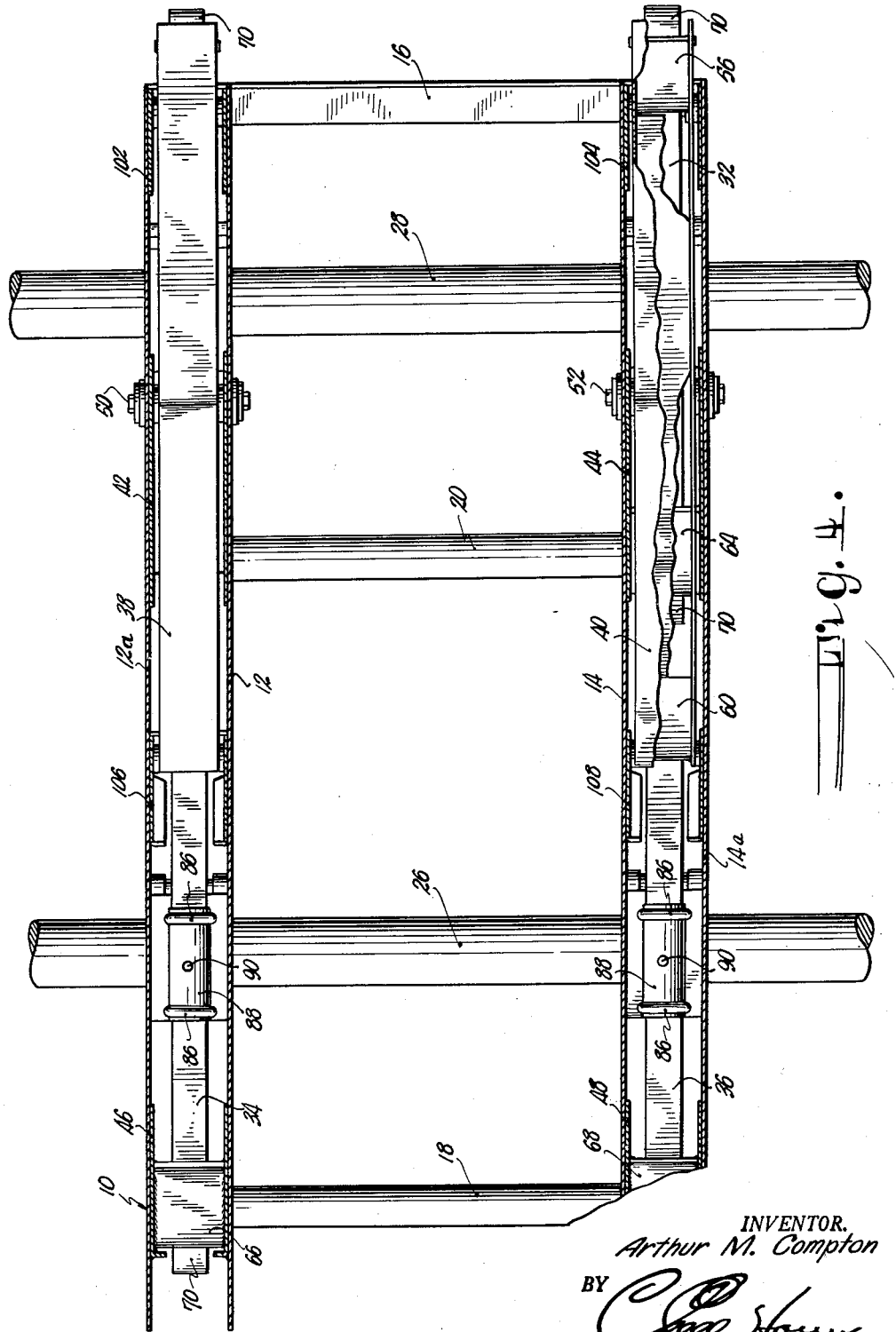
Fig. 4 is a cross-sectional view taken substantially on line IV—IV of Fig. 3, eliminating however, all of the wheels of the assembly, parts being broken away for clearness.

The spring sections are all connected to their axles in the same manner and therefore, only such connection between spring section 34 and axle 26 as shown in Figs. 3 and 6, will be described. Uppermost block 74 and lowermost block 76 are secured rigidly to the axle 26 as by welding and are each provided with arcuate, innermost faces conforming with the circular configuration of the axle 26 so as to seat firmly thereagainst. If axles having I-beam configurations or other shapes are used, blocks 74 and 76 should be shaped accordingly.

The uppermost face of block 74 and the lower face of block 76 are flat and engaged by suitable bearing shims 78 and 80 that are in turn held in place by spaced-apart plates 82 and 84. U-bolts 86 embracing the spring section 34 and looped over a cap 88 on the spring section 34, pass through the plates 82 and 84 attaching the cap 88, the spring section 34, the plates 82 and 84 and shims 78 and 80 together as a unit to the blocks 74 and 76 and, therefore, to the axle 26.

The spring section 34 is, however, free for limited swinging movement with respect to the axle 26 by the provision of aligned pivot pins 90 and 92 rigid to the plates 82 and 84 respectively. The pin 90 passes through the leaf springs of section 34, as well as through cap 88 and shim 78, and the pin 92 passes through the shim 80. Pin 90 is free to rotate in an opening 94 within the block 74, while pin 92 is free to rotate within an opening 96 formed in the block 76. It is to be preferred that the U-bolts 86 not be clamped so tightly as to prevent swinging movement thereof together with the spring unit 34 about the substantially vertical, but rearwardly inclined axes of pins 90 and 92. The pins 90 and 92 are not only normally inclined in such manner, but the spring sections 30, 32, 34 and 36 are all normally canted as best seen in Figs. 1 and 3 with the forwardmost ends thereof higher than their rearmost ends. However, it is to be understood that the pivotal mounting of the springs to the axles may be used separately from the canting of the springs and vice versa.

While the four spring sections are all adapted to slide both longitudinally and transversely with respect to their wear plates, the assemblies 22 and 24 are tied to the trailer frame 10 by radius rods 98 and 100 respectively. Brackets 102 and 104 rigid to beams 12 and 14 respectively, at the forwardmost ends thereof, and depending therefrom, pivotally receive the forwardmost and uppermost ends of the radius rods 100 and brackets 106 and 108 depending from beams 12 and 14 respectively, similarly receive the radius rods 98. The rearmost and lowermost ends of the radius rods 100 are pivotally connected to the axle 28 or the corresponding blocks 74—76 in any suitable manner, and the radius rods 98 are similarly coupled with the axle 26.

It is important to note that the radius rods 98 and 100 are all normally inclined upwardly and forwardly from their corresponding axles 26 and 28. It is preferred further, that the radius rods 98 be either longer than the radius rods 100, or be connected at a different angle so that the effective distance, horizontally and vertically, between the pivotal connections at the ends of the rods 98, be greater than the effective distance, horizontally and vertically, between the pivotal connections at the ends of the rods 100. It is to be preferred that all points of relative movement between the component parts of the undercarriage be provided with rubber bushings or the like to eliminate necessity of lubrication.

In the event that the equalizers 38 and 40 should break or be torn loose from their pivotal mountings, the undercarriage will not be rendered inoperable since, by location thereof directly beneath corresponding beams 12 and 14, there will be a mere sagging of the trailer toward that side thereof that has failed. Such failure however, is not likely because of the fact that the rocker beams 38 and 40 equalize between the forwardmost ends of the spring units, thereby relieving the pivotal trunnions 50 and 52 from the strains of normal use.

It can now be seen also that the normal canting of the spring sections provides for absorption of not only vertical loads but horizontal components and that the radius rods 98 and 100, guide the axles 26 and 28 as well as the spring sections during vertical movements of the frame 10 so as to increase such absorption of the horizontal components as the loads on the springs increase.

While the ends of the spring sections are embraced by the equalizers 38 and 40 as well as by the brackets 42, 44, 46 and 48, to limit the extent of lateral sliding movement with respect to the wear plates, the pivotal connections of the radius rods 98 and 100 should be such as to permit some swinging movement of the axles 26 and 28 on vertical axes in addition to the swinging movement that takes place between the spring units and the axles. During execution of turns or curves therefore, in either direction, the axles 26 and 28 converge in one direction or the other, depending upon the direction of the turn. This is caused by the fact that the radius rods 98 are either longer than the radius rods 100 or disposed at proper angles to effect such convergence of the axles 26 and 28.

It is apparent that by such arrangement of the radius rods, both axles will turn slightly in the same direction but in different amounts during manipulation of curves or turns, causing the axles to converge relatively, thereby providing proper tracking and reducing scuff to the tires. Manifestly, the same undercarriage may be used in a full trailer, or a tractor as well as in a semitrailer as herein shown.

All of the objects initially set forth are attained through use of the structure hereinabove specifically described, and while the details may vary within the spirit of the invention, it is desired to be limited only by the scope of the appended claims.

Having thus described the invention what is claimed as new and desired to be secured by Letters Patent is:

1. In a transportation vehicle having a frame having a pair of spaced, longitudinal beams, an undercarriage including an elongated equalizer directly beneath each beam respectively and pivotally secured thereto intermediate the ends of the equalizers for swinging movement on aligned horizontal axes transversely of the frame; a front wheel and axle assembly beneath the equalizers having a pair of spring sections secured to the axle thereof, there being a spring section underlying each equalizer respectively and having the forwardmost end thereof in supporting relationship to the forwardmost end of its corresponding equalizer; and a rear wheel and axle assembly provided with a pair of spring sections secured to the axle thereof and having the forwardmost ends thereof disposed beneath the rearmost ends of corresponding equalizers in supporting relationship thereto, all of said spring sections extending longitudinally of the trailer and having the rearmost ends thereof disposed beneath corresponding beams in supporting relationship thereto, the spring sections being pivotally secured to the axles for swinging movement about upright axes intersecting the axles diametrically thereof, said axes being normally inclined with respect to vertical to cant the spring sections with the forwardmost ends thereof higher than their rearmost ends.

2. In a transportation vehicle having a frame having a pair of spaced, longitudinal beams, an undercarriage including an elongated equalizer directly beneath each beam respectively and pivotally secured thereto intermediate the ends of the equalizers for swinging movement on aligned horizontal axes transversely of the frame; a front wheel and axle assembly beneath the equalizers having a pair of spring sections secured to the axle thereof, there being a spring section underlying each equalizer respectively and having the forwardmost end thereof in supporting relationship to the forwardmost end of its corresponding equalizer; and a rear wheel and axle assembly provided with a pair of spring sections secured to the axle thereof and having the forwardmost ends thereof disposed beneath the rearmost ends of corresponding equalizers in supporting relationship thereto, all of said spring sections extending longitudinally of the trailer and having the rearmost ends thereof disposed beneath corresponding beams in supporting relationship thereto, the spring sections being pivotally secured to the axles for swinging movement about upright axes intersecting the axles diametrically thereof, the equalizers and the beams being provided with wear plates disposed in overlying engagement with corresponding ends of the spring sections for sliding movement of the latter, transversely and longitudinally of the spring sections, there being a pair of radius rods for each axle respectively, pivotally connecting the same with the beams for free swinging movement of the axles toward and away from the frame, the horizontal and vertical distance between the pivotal connections of the radius rods for the rear axle being greater than the horizontal and vertical distance between the pivotal connections of the radius rods for the front axle.

3. In a transportation vehicle having a frame having a pair of spaced, longitudinal beams, an undercarriage including an elongated equalizer directly beneath each beam respectively and pivotally secured thereto intermediate the ends of the equalizers for swinging movement on aligned horizontal axes transversely of the frame; a front wheel and axle assembly beneath the equalizers having a pair of spring sections secured to the axle thereof, there being a spring section underlying each equalizer respectively and having the forwardmost end thereof in supporting relationship to the forwardmost end of its corresponding equalizer; and a rear wheel and axle assembly provided with a pair of spring sections secured to the axle thereof and having the forwardmost ends thereof disposed beneath the rearmost ends of corresponding equalizers in supporting relationship thereto, all of said spring sections extending longitudinally of the trailer and having the rearmost ends thereof disposed beneath corresponding beams in supporting relationship thereto, the spring sections being pivotally secured to the axles for swinging movement about upright axes intersecting the axles diametrically thereof, the equalizers and the beams being provided with wear plates disposed in overlying engagement with corresponding ends of the spring sections for sliding movement of the latter, transversely and longitudinally of the spring sections, there being a pair of radius rods for each axle respectively, pivotally connecting the same with the beams for free swinging movement of the axles toward and away from the frame, said radius rods normally extending upwardly and forwardly from the axles at an angle toward the frame, said axes being normally inclined with respect to vertical to cant the spring sections with the forwardmost ends thereof higher than their rearmost ends.

4. In a transportation vehicle having a frame, an undercarriage including a pair of tandem wheel and axle assemblies, each provided with a spring unit, each unit having one end thereof disposed in supporting relationship to said frame; and rocker means pivotally secured intermediate the ends thereof to the frame for swinging movement on a horizontal axis, the opposite end of one of said units being in supporting relationship to one end of the rocker means, the opposite end of the other of said units being in supporting relationship to the opposite end of said rocker means, said units each including a pair of sections pivotally secured to corresponding axles for swinging movement about upright axes intersecting the axles diametrically thereof, said axes being normally inclined with respect to the vertical to cant the sections with one end thereof higher than the opposite end thereof.

5. In a transportation vehicle having a frame, an undercarriage including a pair of tandem wheel and axle assemblies, each provided with a spring unit, each unit having one end thereof disposed in supporting relationship to said frame; and rocker means pivotally secured intermediate the ends thereof to the frame for swinging movement on a horizontal axis, the opposite end of one of said units being in supporting relationship to one end of the rocker means, the opposite end of the other of said units being in supporting relationship to the opposite end of said rocker means, there being a pair of radius rods for each axle respectively, pivotally connecting the same with the frame for free swinging movement of the axles toward and away from the frame, the horizontal and vertical distance between the pivotal connections of the radius rods for one axle being greater than the horizontal and vertical distance between the pivotal connections of the radius rods for the other axle.

References Cited in the file of this patent

UNITED STATES PATENTS

| Number | Name | Date |
|---|---|---|
| 1,928,860 | Marcum | Oct. 3, 1933 |
| 2,280,302 | Reid | Apr. 21, 1942 |
| 2,424,141 | Black | July 15, 1947 |
| 2,446,205 | Wickersham | Aug. 3, 1948 |
| 2,624,593 | Stover | Jan. 6, 1953 |